March 29, 1932.  F. D. BROWN  1,851,490
PELLET FORMING MACHINE
Filed Aug. 18, 1931   5 Sheets-Sheet 1

INVENTOR
Francis Dodge Brown
BY
Westall and Wallace
ATTORNEYS

March 29, 1932. F. D. BROWN 1,851,490
PELLET FORMING MACHINE
Filed Aug. 18, 1931   5 Sheets-Sheet 2

INVENTOR
Francis Dodge Brown
BY
Westall and Wallace
ATTORNEYS

March 29, 1932.  F D. BROWN  1,851,490
PELLET FORMING MACHINE
Filed Aug. 18, 1931  5 Sheets-Sheet 3

INVENTOR
*Francis Dodge Brown*
BY *Westall and Wallace*
ATTORNEYS

March 29, 1932.   F. D. BROWN   1,851,490
PELLET FORMING MACHINE
Filed Aug. 18, 1931   5 Sheets-Sheet 4

INVENTOR
Francis Dodge Brown
BY
Westall and Wallace
ATTORNEYS

March 29, 1932. F. D. BROWN 1,851,490

PELLET FORMING MACHINE

Filed Aug. 18, 1931  5 Sheets-Sheet 5

INVENTOR
*Francis Dodge Brown*
BY *Westall and Wallace*
ATTORNEYS

Patented Mar. 29, 1932

1,851,490

UNITED STATES PATENT OFFICE

FRANCIS DODGE BROWN, OF WEST LOS ANGELES, CALIFORNIA, ASSIGNOR OF ONE-HALF TO CHARLES ALAN, OF POMONA, CALIFORNIA

PELLET FORMING MACHINE

Application filed August 18, 1931. Serial No. 557,771.

This invention relates to a machine for acting upon a coherent plastic mass to form pellets. It is especially adaptable to forming pellets of poultry mash and may be used in the process disclosed in my copending application Ser. No. 557,770, filed August 24, 1931 for poultry feed pellets. It is the primary object of this invention to provide a machine into which the plastic mass may be fed and which continuously acts upon that mass to form pellets. Another more specific object of this invention is to provide a machine wherein a sheet is initially formed and the sheet divided into pellets. A further object of this invention is to provide a machine as described wherein the sheet is first separated into strips and thereafter the strips are divided into lengths forming pellets. A still further object of this invention is to provide a machine having features as before described and wherein the pellets are coated with material to prevent sticking together.

Figure 1:
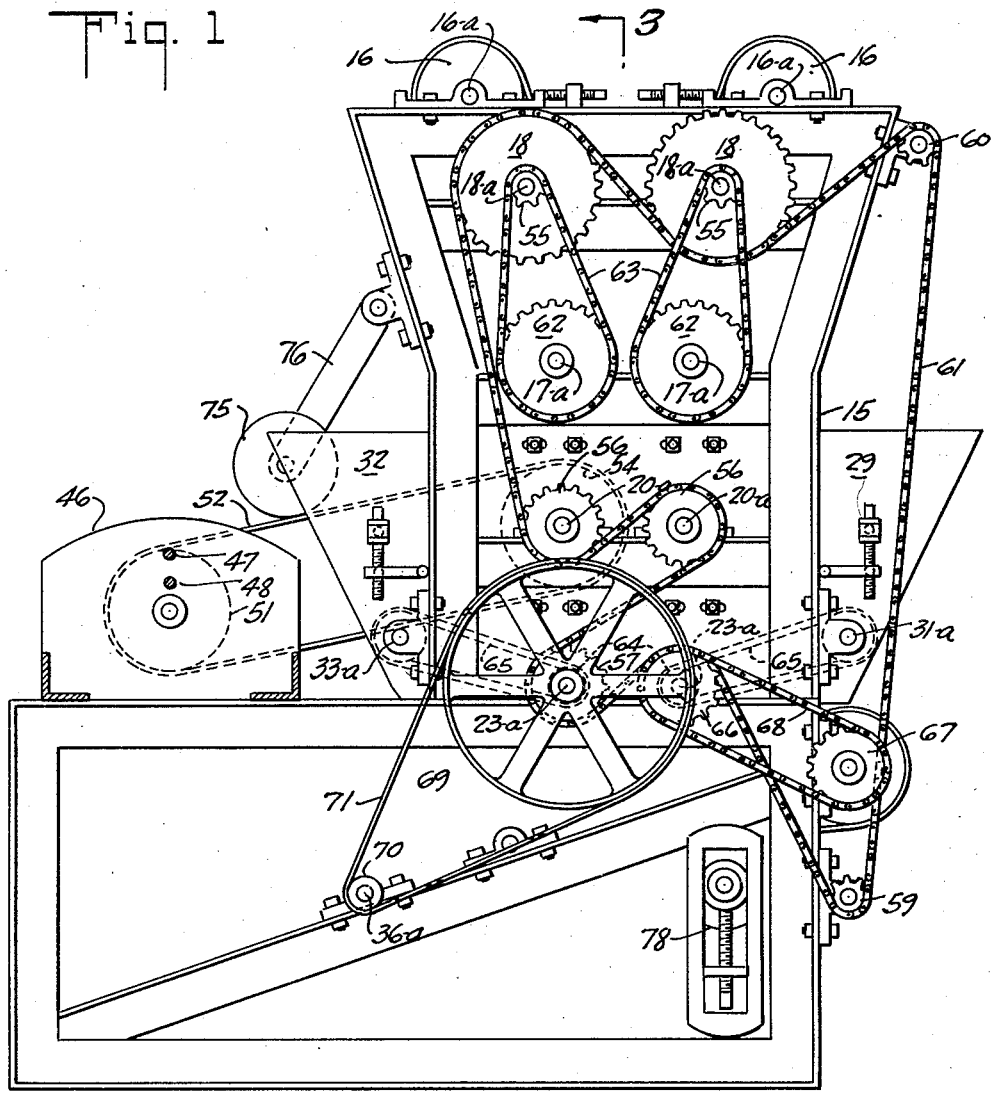
Figure 6:
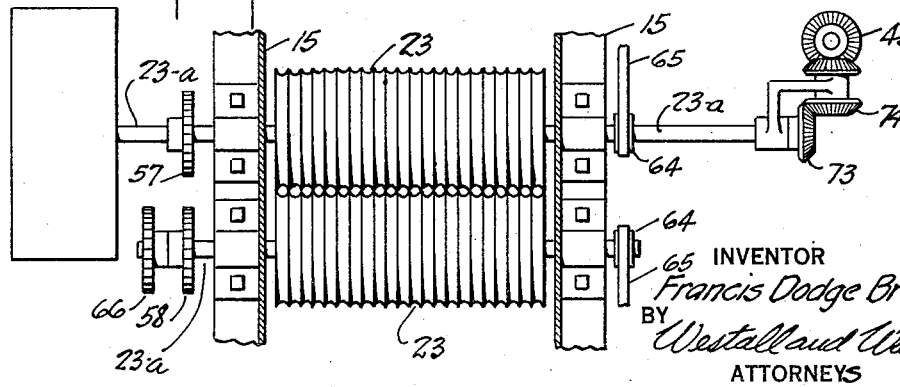
Figure 2:
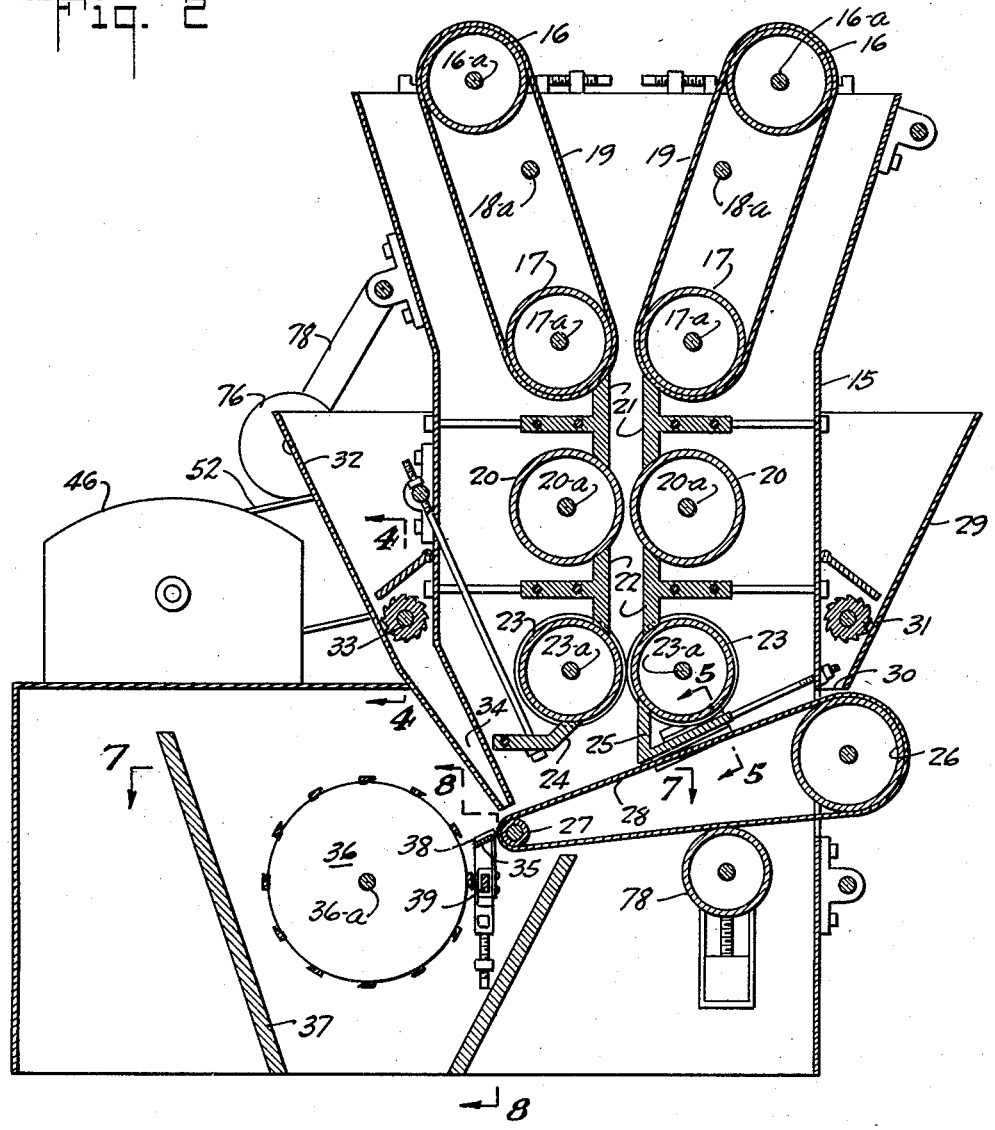
Figure 5:
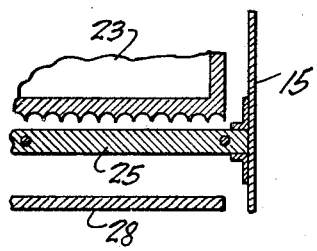
Figure 3:
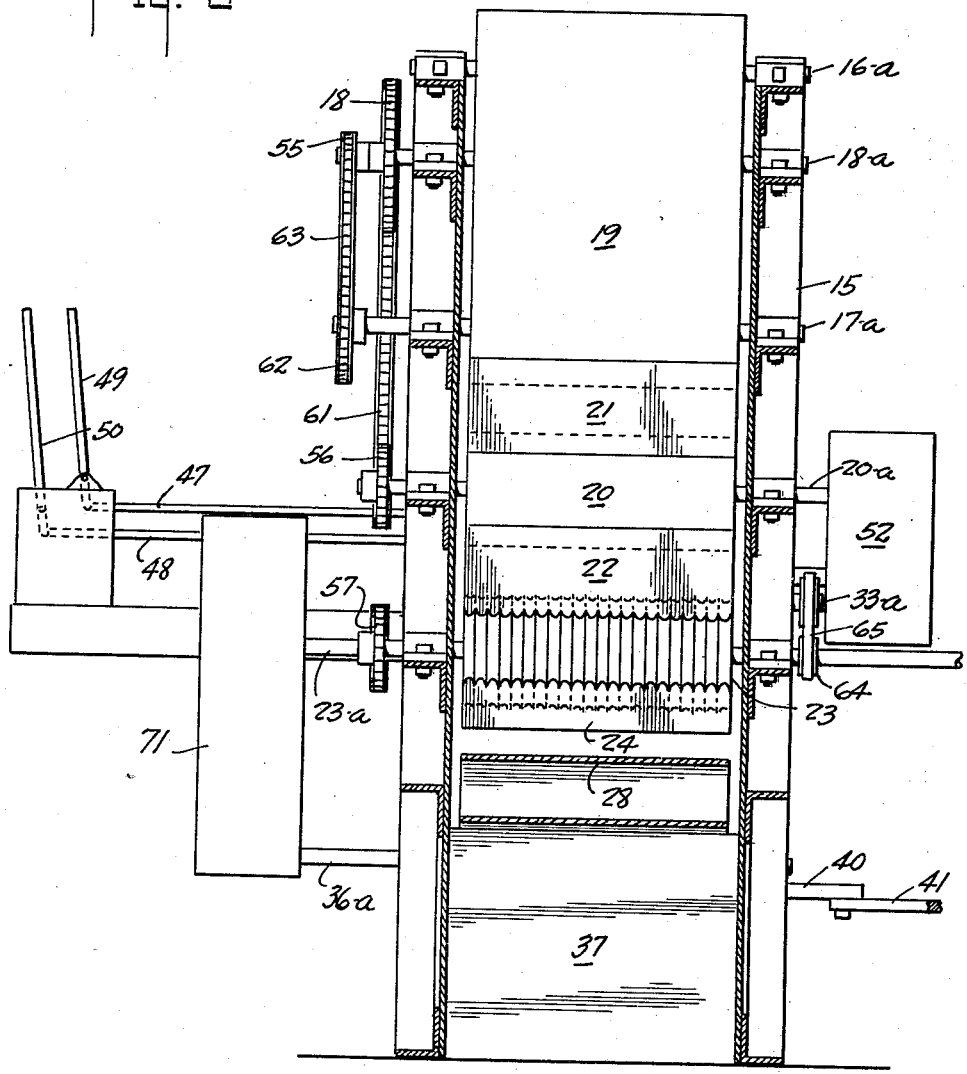
Figure 4:
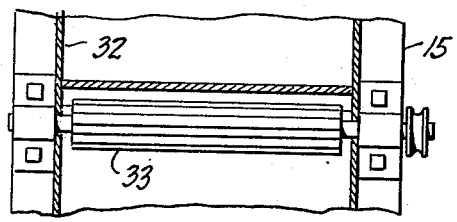
Figure 7:
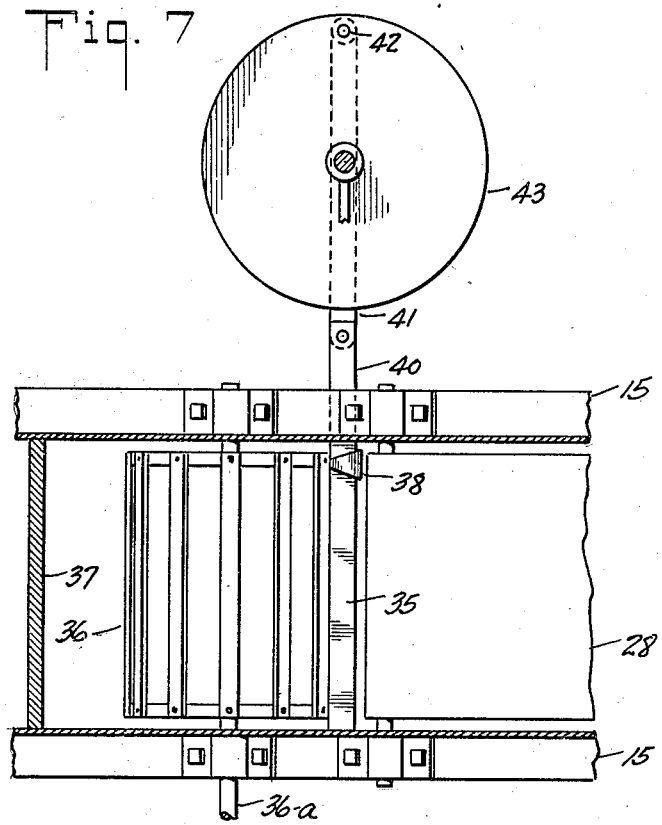
Figure 8:
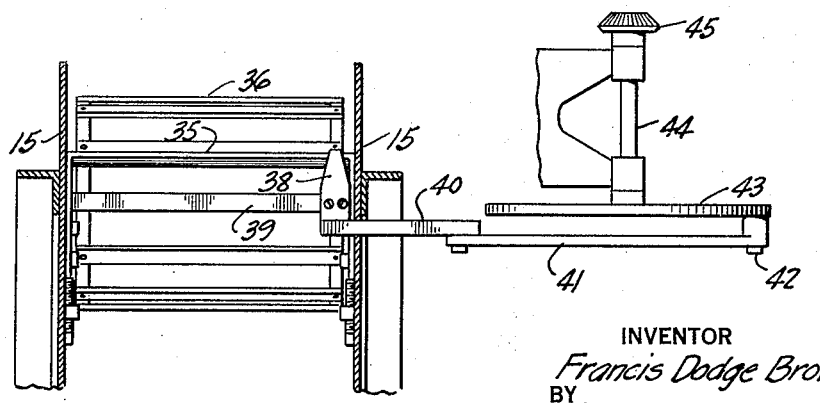
Figure 9:
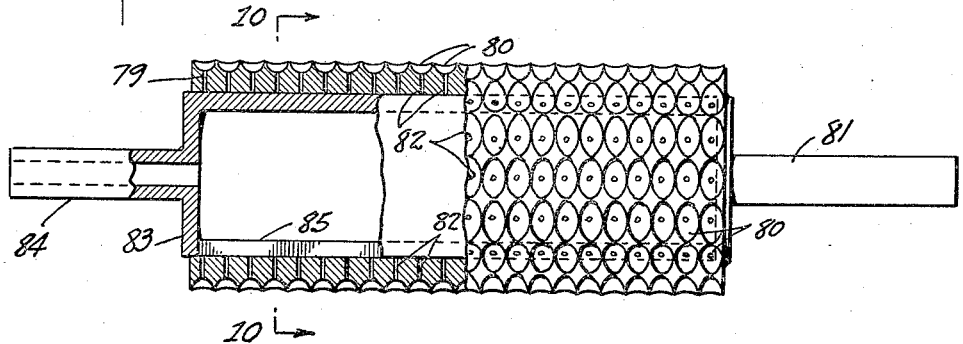
Figure 10:
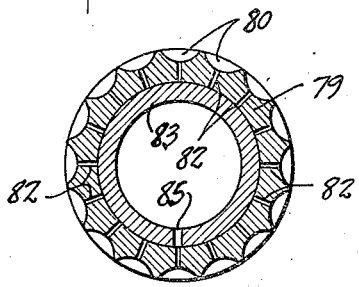
Figure 11:
Figure 12:

These objects are accomplished by means of the embodiment of my invention disclosed in the accompanying drawings, in which:

Fig. 1 is a side elevation of the complete machine; Fig. 2 is a sectional elevation; Fig. 3 is a section as seen on the line 3—3 of Fig. 1; Figs. 4 and 5 are sections as seen on the lines correspondingly numbered in Fig. 2; Fig. 6 is a horizontal section showing a fragment of the machine with the strip forming rollers in plan view; Figs. 7 and 8 are sections as seen on the line correspondingly numbered in Fig. 2; Fig. 9 is an elevation partly in section of a modified form of roller to be substituted for the strip forming rollers to form pellets directly from the sheet; Fig. 10 is a section as seen on the line 10—10 of Fig. 9; Fig. 11 is a perspective view of a pellet formed by the machine shown in Figs. 1 to 8; and Fig. 12 is a perspective view of the pellet formed by the use of the rollers shown in Figs. 9 and 10.

Referring more particularly to Figs. 1 to 8 inclusive, suitable frame work 15 is provided having bars for supporting the rollers, pulleys, gears and other elements forming the structure. Mounted on the top cross bars are bearing blocks adjustable to and from each other and journalled therein are pulley cylinders 16. Journalled upon the frame below the pulleys 16 are pulley cylinders 17. Passed over companion pulleys 16 and 17 are belts 19. Pulleys 16 and 17 are so disposed that the inner runs of belts 19 converge downwardly toward one another and they are caused to travel so that a plastic mass delivered at the top will be advanced downwardly and initially formed into a sheet. Below the pulleys 17 are final sheet forming rollers 20. A passageway is formed between the belts 19 and the rollers 20 by scraper plates 21 which clean any adherent material from the outer surfaces of belts 19. Below rollers 20 are scraper plates 22.

Strip forming rollers are journalled in the frame below scraper plates 22 and comprise contacting cylinders 23, best shown in Fig. 6. The strip forming rollers have half round recesses extending circumferentially so that at the point of contact of the rollers circular passages are formed. The finally formed sheet passes between strip forming rollers 23 and the sheet is molded into parallel strips. Below strip forming rollers 23 are scraper plates 24 and 25 to clean the rollers.

Journalled in the frame at a lower level than rollers 23 are pulley cylinders 26 and 27 over which passes a conveyor belt 28. At the side of the frame is a hopper 29 having a discharge opening 30 directly above the upper run of belt 28. Extending across hopper 29 is an impeller 31. Pulverulent corn meal or like coating material is supplied to hopper 29 and delivered to the upper run of belt 28. At the opposite side of the machine is a hopper 32 with an impeller 33 for causing passage of corn meal through a nozzle 34 whose discharge opening is disposed above the belt 28 to deliver corn meal coating upon the surface of strips which repose upon the belt 28 and are being advanced toward a cutter.

Extending across to the frame is a knife bar 35, the blade thereof having its plane extending in the same direction as the upper run of belt 28 and the blade being disposed adjacent pulley 27. Strips will be advanced by the belt 28 and passed over the stationary knife blade 35. A rotary cutter 36 is journalled in the frame and comprises blades arranged to sweep by the stationary knife 35 and thereby sever the strips into short lengths or pellets. The blades are spaced so that a squirrel cage cylinder is formed. The pellets drop into a chute 37 and are delivered therefrom to drying and toasting apparatus not shown herein. It has been found that the strips may stick to stationary blade 35 and in order to clean the latter, a reciprocating knife 38 is provided. This knife has a blade overhanging the blade of knife 35 and is mounted to slide on a bar 39. The knife 38 is provided with a stem 40 secured to a connecting rod 41. Connecting rod 41 is mounted upon a crank pin 42 extending from a disk 43. Disk 43 is mounted upon a shaft 44 to which a bevel gear 45 is secured for operation as later described.

The rollers, pulleys, rotary cutter and impellers heretofore described have trunnions or shafts designated by reference numerals with the affix "a" added and suitable gearing is provided to rotate the members so as to advance the mass being forced from the intake to the discharge of the machine. At the side of the frame is a change speed motor indicated conventionally by 46, there being control rods 47 and 48 connected to lever handles 49 and 50. A drive pulley 51 has a belt 52 extending therefrom and passing over a pulley 54 mounted upon one of the shafts 20a. A pair of sprocket wheels 18 are journalled in bearings at the top of the frame and mounted upon their shafts 18a are sprocket pinions 55. Mounted on shaft 20a are sprocket wheels 56. A sprocket wheel 57 is mounted on shaft 23a and a sprocket wheel 58 on shaft 23a. Journalled on the side of the frame are sprocket wheels 59 and 60. A sprocket chain 61 is passed around wheels 18, 56, 57, 58, 59 and 60. Thus, the shafts 18a, 20a, 23a and 26a are driven by the chain 61. Sprocket wheels 62 are mounted on shaft 17a and geared to sprocket pinions 55 by chain 63. Thus, roller pulleys 17 are driven. On shaft 23a are pulleys 64 geared to pulleys on impeller 31 by belts 65. Thus, the impellers 31 are driven. A sprocket wheel 66 is mounted on one of the shafts 23a and geared to a sprocket wheel 67 by means of a chain 68. This provides for driving the conveyor belt 28. Shaft 23a has a pulley 69 geared to a pulley 70 on shaft 36 by means of a belt 71. This provides for driving the rotary cutter. One of the shafts 23a has a bevel pinion 73 meshing with a bevel pinion 74 forming one of a pair, the other member of the pair meshing with bevel pinion 45, thus serving to drive the cleaning knife 38.

In order to take up any slack in the drive belt, a take-up roller 75 is mounted on arm 76 and rides upon the upper surface of belt 52. For the conveyor belt 28 an adjustable roller 78 is provided. The adjustable bearing for shaft 16a provides for maintaining belt 19 taut. Obviously, there are other adjustable bearings which are common mechanical expedients.

The machine illustrated is adapted to form pellets of a poultry food mash. The mash is ground and mixed with liquid to form a doughy mass which is fed into the intake of the machine between belts 19. It is carried downwardly by the belts and initially formed into a sheet. This sheet passes through the final sheet forming rollers 20 and emerges therefrom in final form. Next it passes between the strip forming rollers 23 and the mass is delivered in strips to the conveyor belt 28 which has been coated with corn meal. The strips are further covered on their upper faces with corn meal and passed to the cooperating rotary cutter 36 and knife 35 where the strips are severed into pellets and dropped through chute 37 for further treatment.

The pellets have a substantially dry outer coating of corn meal. Although the pellets are form retaining, they are soft. They are then passed through a dryer which takes out the surface moisture and then through a hot dryer, but are not allowed to remain sufficiently long to generate steam such as would disrupt the pellets. Next, they are passed through a toaster. The last operations are not shown or illustrated herein and form the subject matter of a copending application.

There may be substituted for the strip forming rollers and the knife cutter, rollers which directly form the pellets from the sheets. Such rollers are shown in Figs. 9 and 10. Instead of one of the rollers 23, a roller 79 consisting of a shell having circumferential series of pits 80 formed therein. The roller 79 is carried on one trunnion 81 and the other end is open. Ducts 82 place the pits in communication with the bore of the shell. Mounted in the bore of shell 79 is a stationary shell 83 having a hollow trunnion 84. A longitudinally extending slot 85 is formed in shell 83. The hollow trunnion 84 is connected to an air blower, the arrangement being such that as the shell 79 revolves a longitudinal row of ducts 82 register with slot 85 and air is forced through the ducts. This will dislodge from the pits any of the pellets which may stick therein. A cooperating roller may consist of a smooth face roller similar to the pressure roller 20. There are other obvious changes in the structure which may be made without departing from the invention.

What I claim is:

1. A food pellet forming machine for acting upon a coherent mass comprising a frame; a pair of juxtaposed endless belts at the intake of said machine converging toward one another from the intake end toward the discharge end of the machine for initially forming a sheet of said mass; a pair of juxtaposed final sheet forming rollers at the discharge end of said belts to receive and finally form said sheet; a pair of molding rollers disposed to receive said sheet and provided with circumferential indentations to divide said sheet; a conveyor belt disposed for delivery of the divisions from said molding rollers to said conveyor belt; a revolving cutter for severing said divisions into pellets as they pass from said conveyor belt; and means to move said belts, rollers and revolving cutter to advance said coherent mass through said machine from inlet to discharge.

2. A food pellet forming machine for acting upon a coherent mass comprising a frame; a pair of juxtaposed endless belts at the intake of said machine converging toward one another from the intake end toward the discharge end of the machine for initially forming a sheet of said mass; a pair of juxtaposed final sheet forming rollers at the discharge end of said belts to receive and finally form said sheet; a pair of strip forming rollers disposed to receive said sheet and provided with circumferential grooves to mold and compress said sheet into strips; a strip belt disposed for delivery of the strips from said strip forming rollers to said strip belt; a cutter to sever said strips into pellets; and means to move said belts, rollers and cutter to advance said mass through said machine from inlet to discharge.

3. A food pellet forming machine for acting upon a coherent mass comprising a frame; a pair of juxtaposed endless belts at the intake of said machine converging toward one another from the intake end toward the discharge end of the machine for initially forming a sheet of said mass; a pair of juxtaposed final sheet forming rollers at the discharge end of said belts to receive and finally form said sheet; a pair of strip forming rollers disposed to receive said sheet and provided with circumferential grooves to mold and compress said sheet into strips; a strip belt disposed for delivery of the strips from said strip forming rollers to said strip belt; a stationary knife at the discharge end of said strip belt for passage thereover of said strips in their advance; a cleaning knife reciprocable across said stationary knife; a revolving cutter having a plurality of spaced knives to coact with said stationary knife and sever said strips into pellets, and means to move said belts, rollers and revolving cutter to advance said mass through said machine from inlet to discharge and to reciprocate said cleaning knife.

4. A food pellet forming machine for acting upon a coherent mass comprising a frame; a pair of juxtaposed endless belts at the intake of said machine converging toward one another from the intake end toward the discharge end of the machine for initially forming a sheet of said mass; a pair of juxtaposed final sheet forming rollers at the discharge end of said belts to receive and finally form said sheet; a pair of molding rollers disposed to receive said sheet and provided with circumferential indentations to divide said sheet; a conveyor belt disposed for delivery of the divisions from said molding rollers to said conveyor belt; means to coat said conveyor belt with a dry pulverulent mass for the divisions reposing thereon; a revolving cutter for severing said divisions into pellets as they pass from said conveyor belt; and means to move said belts, rollers and revolving cutter to advance said mass through said machine from inlet to discharge.

5. A food pellet forming machine for acting upon a coherent mass comprising a frame; a pair of juxtaposed endless belts at the intake of said machine converging toward one another from the intake end toward the discharge end of the machine for initially forming a sheet of said mass; a pair of juxtaposed final sheet forming rollers at the discharge end of said belts to receive and finally form said sheet; a pair of molding rollers disposed to receive said sheet and provided with circumferential indentations to divide said sheet; a conveyor belt disposed for delivery of the divisions from said molding rollers to said conveyor belt; a hopper and means therein to supply a pulverulent dry mass to the upper run of said conveyor belt in advance of said divisions; a hopper and means therein to supply a pulverulent dry mass over the divisions reposing on said conveyor belt; a revolving cutter for severing said divisions into pellets as they pass from said conveyor belt, and means to move said belts, rollers and revolving cutter to advance said mass through said machine from inlet to discharge.

6. A food pellet forming machine for acting upon a coherent mass comprising a frame; a pair of juxtaposed endless belts at the intake of said machine converging toward one another from the intake end toward the discharge end of the machine for initially forming a sheet of said mass; a pair of juxtaposed final sheet forming rollers at the discharge end of said belts to receive and finally form said sheet; a pair of strip forming rollers disposed to receive said sheet and provided with circumferential grooves to mold and compress said sheet into strips; a strip belt disposed for delivery of the strips from said strip forming rollers to said strip belt; means to coat the strips reposing on said strip belt with a dry pulverulent mass; cutter means to sever said strips into pellets; and means to move said belts, rollers and cutter means to advance said mass through said machine from inlet to discharge.

7. A food pellet forming machine for acting upon a coherent mass comprising a frame; a pair of juxtaposed endless belts at the intake of said machine converging toward one another from the intake end toward the discharge end of the machine for initially forming a sheet of said mass; a pair of juxtaposed final sheet forming rollers at the discharge end of said belts to receive and finally form said sheet; a pair of strip forming rollers disposed to receive said sheet and provided with circumferential grooves to mold and compress said sheet into strips; a strip belt disposed for delivery of the strips from said strip forming rollers to said strip belt; a hopper and means therein to supply a pulverulent dry mass to the upper run of said strip belt in advance of said strips, a hopper and means therein to supply a pulverulent dry mass over the strips reposing on said strip belt; cutter means to sever said strips into pellets; and means to move said belts, rollers and cutter means to advance said mass through said machine from inlet to discharge.

8. A food pellet forming machine for acting upon a coherent mass comprising a frame; a pair of juxtaposed endless belts at the intake of said machine converging toward one another from the intake end toward the discharge end of the machine for initially forming a sheet of said mass; a pair of juxtaposed final sheet forming rollers at the discharge end of said belts to receive and finally form said sheet; a pair of strip forming rollers disposed to receive said sheet and provided with circumferential grooves to mold and compress said sheet into strips; a strip belt disposed for delivery of the strips from said strip forming rollers to said strip belt; means to coat the strips reposing on said strip belt with a dry pulverulent mass; a stationary knife at the discharge end of said strip belt for passage thereover of said strips in their advance; a cleaning knife reciprocable across said stationary knife; a revolving cutter having a plurality of spaced knives to coact with said stationary knife and sever said strips into pellets; and means to move said belts, rollers and revolving cutter to advance said mass through said machine from inlet to discharge and to reciprocate said cleaning knife.

9. A food pellet forming machine for acting upon a coherent mass comprising a frame; a pair of juxtaposed endless belts at the intake of said machine converging toward one another from the intake end toward the discharge end of the machine for initially forming a sheet of said mass; a pair of juxtaposed final sheet forming rollers at the discharge end of said belts to receive and finally form said sheet; a pair of strip forming rollers disposed to receive said sheet and provided with circumferential grooves to mold and compress said sheet into strips; a strip belt disposed for delivery of the strips from said strip forming rollers to said strip belt; a hopper and means therein to supply a pulverulent dry mass to the upper run of said belt in advance of said strips, a hopper and means therein to supply a pulverulent dry mass over the strips reposing on said strip belt; a stationary knife at the discharge end of said strip belt for passage thereover of said strips in their advance; a revolving cutter having a plurality of spaced knives to coact with said stationary knife and sever said strips into pellets; and means to move said belts, rollers and revolving cutter to advance said mass through said machine from inlet to discharge.

10. A food pellet forming machine for acting upon a coherent mass comprising a frame; a pair of juxtaposed endless belts at the intake of said machine converging toward one another from the intake end toward the discharge end of the machine for initially forming a sheet of said mass; a pair of juxtaposed final sheet forming rollers at the discharge end of said belts to receive and finally form said sheet; a pair of strip forming rollers disposed to receive said sheet and provided with circumferential grooves to mold and compress said sheet into strips; a strip belt disposed for delivery of the strips from said strip forming rollers to said strip belt; a hopper and means therein to supply a pulverulent dry mass to the upper run of said belt in advance of said strips, a hopper and means therein to supply a pulverulent dry mass over the strips reposing on said strip belt; a stationary knife at the discharge end of said strip belt for passage thereover of said strips in their advance; a cleaning knife reciprocable across said stationary knife; a revolving cutter having a plurality of spaced knives to coact with said stationary knife and sever said strips into pellets; and means to move said belts, rollers and revolving cutter to advance said mass through said machine from inlet to discharge and to reciprocate said cleaning knife.

11. A food pellet forming machine for acting upon a coherent mass comprising a frame; a pair of molding rollers disposed to receive a sheet of said mass and provided with circumferential indentations to divide said sheet; sheet forming means disposed to form and feed a sheet of said mass to said rollers; a conveyor belt disposed for delivery of the divisions from said rollers to said belt; cutter means for severing said divisions into pellets as they pass from said conveyor belt; and mechanism to operate said rollers, belt and means to advance said mass through said machine from inlet to discharge.

12. A food pellet forming machine for acting upon a coherent mass comprising a frame; a pair of molding rollers disposed to receive a sheet of said mass and provided with circumferential indentations to divide said sheet; sheet forming means disposed to feed said mass to said rollers; a conveyor belt disposed for delivery of the divisions from said rollers to said belt; a hopper and feed means therein to supply a pulverulent dry mass to said belt; cutter means for severing said divisions into pellets as they pass from said conveyor belt; and mechanism to operate said rollers, belt, sheet forming means and feed means.

13. A food pellet forming machine for acting upon a coherent mass comprising a frame; a pair of molding rollers disposed to receive a sheet of said mass and provided with circumferential indentations to divide said sheet; sheet forming means disposed to feed said mass to said rollers; a conveyor belt disposed for delivery of the divisions from said rollers to said belt; a revolving cutter for severing said divisions into pellets as they pass from said conveyor belt; and mechanism to operate said rollers, belt means and cutter.

14. A food pellet forming machine for acting upon a coherent mass comprising a frame; a pair of molding rollers disposed to receive a sheet of said mass and provided with circumferential indentations to divide said sheet; sheet forming means disposed to feed said mass to said rollers; a conveyor belt disposed for delivery of the divisions from said rollers to said belt; a hopper and feed means therein to supply a pulverulent dry mass to said belt; a revolving cutter for severing said divisions into pellets as they pass from said conveyor; and mechanism to operate said rollers, belt, means and cutter.

15. A food pellet forming machine for acting upon a coherent mass comprising a frame; a pair of molding rollers disposed to receive a sheet of said mass and provided with circumferential indentations to divide said sheet; sheet forming means disposed to feed said mass to said rollers; a conveyor belt disposed for delivery of the divisions from said rollers to said belt; a stationary knife at the discharge end of said belt for passage thereover of said divisions; a revolving cutter having a plurality of spaced knives to coact with said stationary knife and sever said divisions into pellets; and mechanism to operate said means, rollers, belt and cutter.

16. A food pellet forming machine for acting upon a coherent mass comprising a frame; a pair of juxtaposed endless belts at the intake of said machine converging towards one another from the intake end toward the discharge end of the machine for initially forming a sheet of said mass; a pair of juxtaposed final sheet forming rollers at the discharge end of said belts to receive and finally form said sheet; a pair of molding rollers disposed to receive said sheet and provided with circumferential indentations to divide said sheet; a conveyor belt disposed for delivery of divisions from said molding rollers to said conveyor belt; a stationary knife at the discharge end of said conveyor belt for passage thereover of said divisions; a revolving cutter having a plurality of spaced knives to coact with said stationary knife and sever said divisions into pellets; and means to move said belts, rollers and revolving cutter to advance said mass through said machine from inlet to discharge.

In witness that I claim the foregoing I have hereunto subscribed my name this 28th day of July, 1931.

FRANCIS DODGE BROWN.